United States Patent
Chen

(10) Patent No.: US 8,830,412 B2
(45) Date of Patent: Sep. 9, 2014

(54) SUBSTRATE AND MANUFACTURING METHOD OF PANEL DISPLAY DEVICE AND CORRESPONDING LIQUID CRYSTAL DISPLAY PANEL

(75) Inventor: Cheng-hung Chen, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 241 days.

(21) Appl. No.: 13/581,306

(22) PCT Filed: Jun. 26, 2012

(86) PCT No.: PCT/CN2012/077526
§ 371 (c)(1),
(2), (4) Date: Aug. 25, 2012

(87) PCT Pub. No.: WO2013/185377
PCT Pub. Date: Dec. 19, 2013

(65) Prior Publication Data
US 2013/0335655 A1     Dec. 19, 2013

(30) Foreign Application Priority Data
Jun. 13, 2012   (CN) .......................... 2012 1 0194343

(51) Int. Cl.
*G02F 1/136*     (2006.01)

(52) U.S. Cl.
USPC .............................. 349/41; 349/139; 349/149

(58) Field of Classification Search
USPC .................................... 349/41, 139, 143, 149
See application file for complete search history.

(56) References Cited

U.S. PATENT DOCUMENTS

2013/0321724 A1*  12/2013  Chen ............................... 349/33
2013/0321728 A1*  12/2013  Chen ............................... 349/41

* cited by examiner

*Primary Examiner* — Richard Kim
*Assistant Examiner* — David Chung
(74) *Attorney, Agent, or Firm* — Andrew C. Cheng

(57) ABSTRACT

The present invention provides a substrate for array process of panel display device, which includes a cell switch set and a PVSA mode pad set. Cell switch set includes a plurality of switch elements. PSVA mode pad set includes a data scan pad and a common electrode pad. Data scan pad is connected through some switch elements of cell switch set to a plurality of scan lines and data lines. Common electrode pad is connected through switch element to common electrode line in the area. The present invention further provides a panel display device and manufacturing method of liquid crystal display panel. In this manner, the present invention reduces the number of pads in PSVA mode pad set to simplify peripheral routes.

9 Claims, 6 Drawing Sheets

SUBSTRATE AND MANUFACTURING METHOD OF PANEL DISPLAY DEVICE AND CORRESPONDING LIQUID CRYSTAL DISPLAY PANEL

BACKGROUND OF THE INVENTION

1. Field of the Invention

The present invention relates to the field of panel displaying techniques, and in particular to a substrate and manufacturing method of panel display device and corresponding liquid crystal display panel.

2. The Related Arts

As the technology develops rapidly, panel display device, in particular, liquid crystal display devices, due to the advantages of high resolution, reduced thickness, light weight, and low power consumption, find wide applications in the field of displaying for mobile phones, notebook PC, desktop PC, TV and other consumer products, and gradually replace the conventional cathode ray tube (CRT) to become the mainstream of the display devices.

The manufacturing process of LCD device usually includes three stages, i.e., the first stage of array process, the second stage of cell process and the third stage of module process. As shown in FIG. 1, in the array process, a plurality of areas 11 corresponding to display panels is formed simultaneously on a glass substrate 10, with each of areas 11 corresponding to display panels electrically connected through a corresponding shorting bar pad set 12 to a corresponding polymer stabilization vertical alignment (PSVA) mode pad set 14 of PSVA mode pad set 13 so as to apply voltage to each display panel during array process to form pretilt angle of liquid crystal molecules. In addition, close to border of glass substrate 10, PSVA mode pad set 13 further includes a PSVA mode color filter (CF) pad 15, electrically connected to transfer structure 16 on glass substrate 10, wherein transfer structure 16 is used for conducting vertical signals between upper and lower substrates.

Furthermore, also refer to FIG. 2. All scan lines G1, G2, . . . , Gn on each area 11 corresponding to display panel are electrically connected respectively to corresponding scan lead 17, then electrically connected to each corresponding scan pad respectively of shorting bar pad set 12 corresponding o area 11, and then electrically connected to scan pad of corresponding PSVA mode pad set 14 of PSVA mode pad set 13. All data lines D1, D2, . . . , Dm on each area 11 corresponding to display panel are electrically connected respectively to corresponding data lead 18, then electrically connected to each corresponding data pad respectively of shorting bar pad set 12 corresponding o area 11, and then electrically connected to scan pad of corresponding PSVA mode pad set 14 of PSVA mode pad set 13.

Also, shorting bar pad set 12 corresponding to area 11 further includes common signal pad "corn" and color filter pad "CF", wherein common signal pad corn is electrically connected to common electrode of area 11 and color filter pas CF is connected to transfer structure 16 of area 11 for transferring signals vertically between upper and lower substrates.

Accordingly, PSVA mode pad set 14 of PSVA mode pad set 13 further includes common signal pad "com", electrically connected to common signal pad corn of shorting bar pad set 12.

Therefore, in array process, voltage is applied through pad of corresponding PSVA mode pad set 14 of PSVA mode pad set 13 for pretilt angle processing of liquid crystal molecules of each area 11.

However, as shown in FIGS. 1-2, when number of areas 11 corresponding to display panels on glass substrate 1o is large, or number of types of signals of short-circuit bar in each area 11 is large, number of pads of PSVA mode display pad set 13 at border of glass substrate 10 is also large, resulting in increase in number of probes for applying voltage during PSVA test. As the number of PSVA test probes increases, probability of bad contact will also increase to cause PSVA curing anomaly, leading to defect rate of display panel. Besides, when number of areas 11 corresponding to display panels on glass substrate 1o is large, or number of types of signals of short-circuit bar in each area 11 is large, the overall design complexity of peripheral routes also increases

SUMMARY OF THE INVENTION

The technical issue to be addressed by the present invention is to provide a substrate and manufacturing method of panel display device, and corresponding liquid crystal display panel, to reduce number of pads in peripheral routes and reduce number of PVSA test probes to simplify complexity of peripheral routes.

The present invention provides a substrate for array process of panel display device, which comprises: at least an area corresponding to display panel, which further comprising a plurality of scan lines, a plurality of data lines, common electrode lines and a plurality of pixel units, the plurality of data lines and the plurality of scan lines being arranged in a checkerboard manner, each pixel unit electrically connected to a corresponding scan line and a corresponding data line; at least a shorting bar pad set, further comprising a plurality of scan liner pads electrically connected to the scan lines in a one-to-one correspondence manner, data liner pads electrically connected to data lines in a one-to-one correspondence manner, common electrode liner pad electrically connected to common electrode line, and color filter liner pad electrically connected to color filter substrate electrode; at least a wire serially connected to conductive hole, conductive hole being for connecting to color filter substrate electrode; at least a cell switch set, comprising a plurality of switch elements; and a PSVA mode pad set, further comprising at least a scan pad, at least a data scan pad and at least a common electrode pad; wherein a data scan pad selecting through the at least two switch elements to electrically connect to or disconnect from a same number of scan lines, data lines; common electrode pad being electrically connected to wire serially connected to conductive hole, and electrically connected to common electrode liner pad through at least another switch element, each switch element comprising: a first metal layer, electrically connected to a data scan pad or a wire serially connected to conductive hole; a second metal layer, disposed opposite to the first metal layer and electrically connected to a scan liner pad, a data liner pad or a common electrode liner pad, and an insulation layer, disposed between the first metal layer and the second metal layer; wherein before cell process, the insulation layer insulating the first metal layer and the second metal layer from each other to realize selection of electrical connection or disconnection between the switch element and a scan line, a data line or a common electrode line; during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch element and a scan line, a data line or a common electrode line.

According to a preferred embodiment of the present invention, number of data scan pad and number of common electrode pad are both 1.

The present invention provides a method for manufacturing panel display device, which comprises: forming a plurality of scan lines, a plurality of data lines, common electrode line and a plurality of pixel units on an area corresponding to display panel, the plurality of data lines and the plurality of scan lines being arranged in a checkerboard manner, each pixel unit electrically connected to a corresponding scan line and a corresponding data line; forming at least a shorting bar pad set, at least a wire serially connected to conductive hole for connecting to color filter substrate electrode, at least a cell switch set and a PSVA mode pad set, the at least a shorting bar pad set further comprising a plurality of scan liner pads electrically connected to the scan lines in a one-to-one correspondence manner, data liner pads electrically connected to data lines in a one-to-one correspondence manner, and common electrode liner pad electrically connected to common electrode line; the at least cell switch set comprising a plurality of switch elements; the PSVA mode pad set comprising at least a data scan pad and at least a common electrode pad; wherein a data scan pad selecting through the at least two switch elements to electrically connect to or disconnect from a same number of scan lines, data lines; common electrode pad being electrically connected to wire serially connected to conductive hole, and electrically connected to common electrode liner pad through at least another switch element; electrically conducting switch elements of cell switch set so as to use data scan pad and common electrode pad in the PSVA mode pad set to perform pretilt angle processing of liquid crystal molecules.

According to a preferred embodiment of the present invention, a step prior to the step of electrically conducting switches in the cell switch comprises: using the shorting bar pad set to perform test on scan lines, data lines and common electrode line correspondingly connected to shorting bar pad set.

According to a preferred embodiment of the present invention, each switch element comprises: a first metal layer, electrically connected to a data scan pad or a wire serially connected to conductive hole; a second metal layer, disposed opposite to the first metal layer and electrically connected to a scan liner pad, a data liner pad or a common electrode liner pad, and an insulation layer, disposed between the first metal layer and the second metal layer; wherein before cell process, the insulation layer insulating the first metal layer and the second metal layer from each other to realize selection of electrical connection or disconnection between the switch element and a scan line, a data line or a common electrode line; during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch element and a scan line, a data line or a common electrode line.

According to a preferred embodiment of the present invention, number of data scan pad and number of common electrode pad are both 1.

According to a preferred embodiment of the present invention, the shorting bar pad set further comprises a color filter liner pad, for connecting color filter substrate electrode.

The present invention provides a liquid crystal display panel, which comprises: an array substrate, a color filter substrate and a liquid crystal layer sandwiched between the array substrate and the color filter substrate; the array substrate further comprising: an area corresponding to display panel, which further comprising a plurality of scan lines, a plurality of data lines, common electrode lines and a plurality of pixel units, the plurality of data lines and the plurality of scan lines being arranged in a checkerboard manner, each pixel unit electrically connected to a corresponding scan line and a corresponding data line; a shorting bar pad set, further comprising a plurality of scan liner pads electrically connected to the scan lines in a one-to-one correspondence manner, data liner pads electrically connected to data lines in a one-to-one correspondence manner, and common electrode liner pad electrically connected to common electrode line; a wire serially connected to conductive hole, disposed outside of area corresponding to display panel, conductive hole being for connecting to color filter substrate electrode; a cell switch set, disposed outside of area corresponding to display panel, comprising a plurality of switch elements, each end of each switch element being electrically connected to a corresponding scan liner pad, data liner pad or common electrode liner pad; wherein the other end of at least two switch elements being electrically connected, the other end of at least two switch elements, through the at least two switch elements, selecting electrically connected to or disconnected from a same number of scan lines; the other end of at least two switch elements being electrically connected, the other end of at least another two switch elements, through the at least another two switch elements, selecting electrically connected to or disconnected from a same number of data lines; the other end of at least another switch element, through the at least another switch element, selecting electrically connected to or disconnected from common electrode line.

According to a preferred embodiment of the present invention, the shorting bar pad set further comprises a color filter liner pad, for connecting color filter substrate electrode.

The efficacy of the present invention is that to be distinguished from the state of the art. The present invention is only required to dispose at least a data scan pad and a common electrode pad in PSVA mode pad set to work with switch elements of cell switch set to apply voltage respectively to a plurality of scan lines, data lines and common electrode line of an area corresponding to display panel to form pretilt angle of liquid crystal molecules. In other words, the present invention is not required to, as known techniques, to dispose a same number of scan pads for scan lines of corresponding area in PSVA mode pad set, and a same number of data pads for data lines. Hence, number of test pads in PSVA mode pad set is greatly reduced.

In an exemplary embodiment of the present invention, only two test pads are required for the PSVA mode pad set, i.e., data scan pad and common electrode pad. The number of test pads is greatly reduced and peripheral routes are simplified to improve the yield rate of PSVA process.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
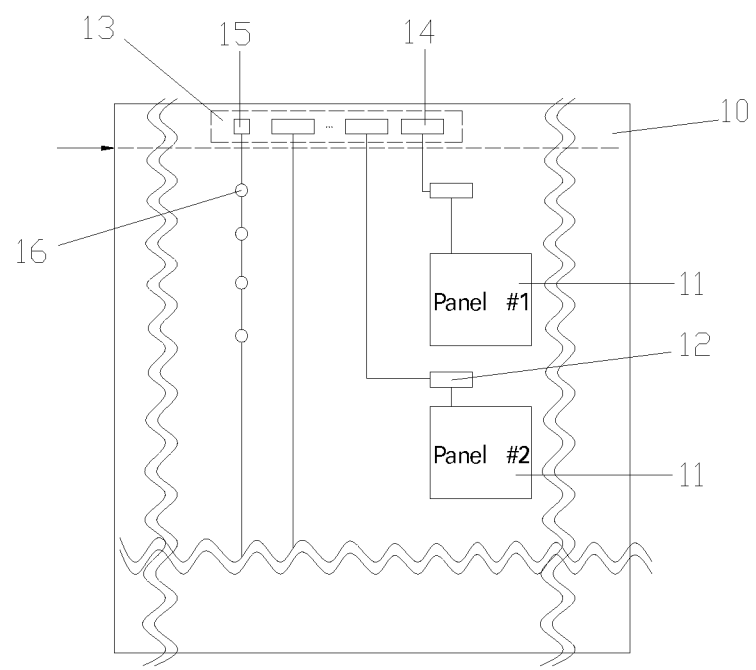
FIG. 1 is a schematic view showing the structure of a substrate for array process of a panel display device of a known technique.
Figure 2:
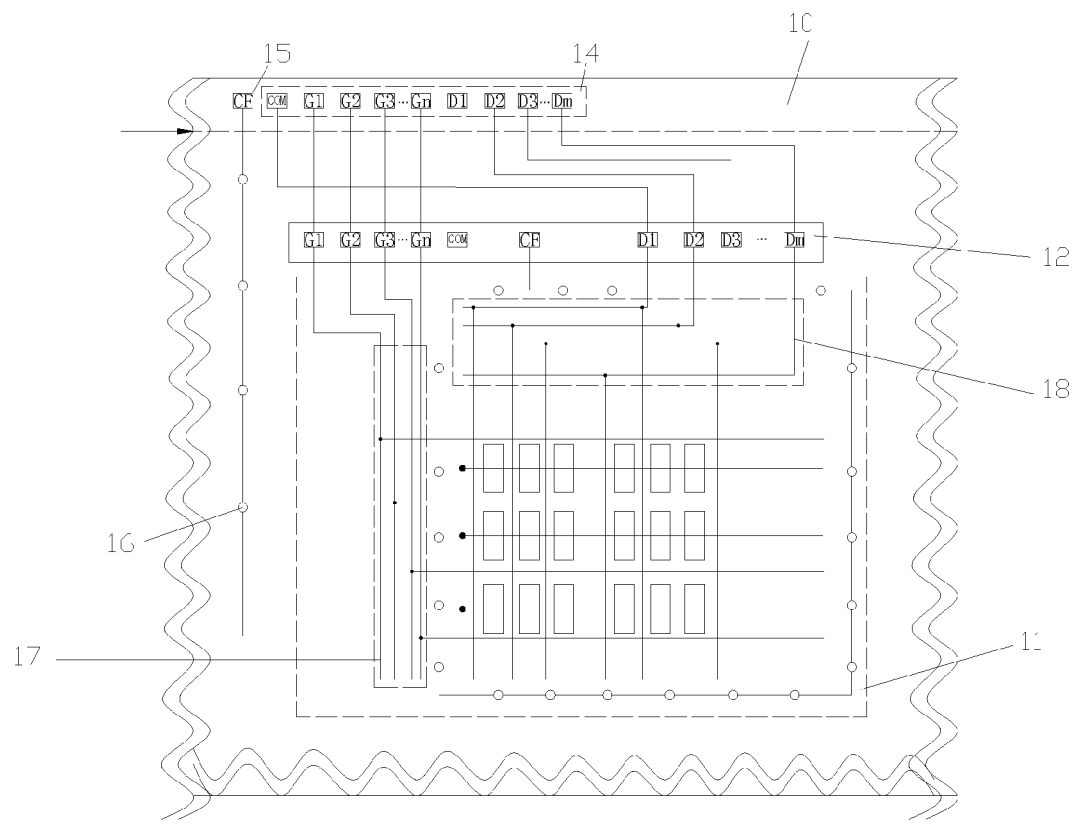
FIG. 2 is a schematic view showing the detailed structure of a substrate for array process of a panel display device of a known technique.
Figure 3:
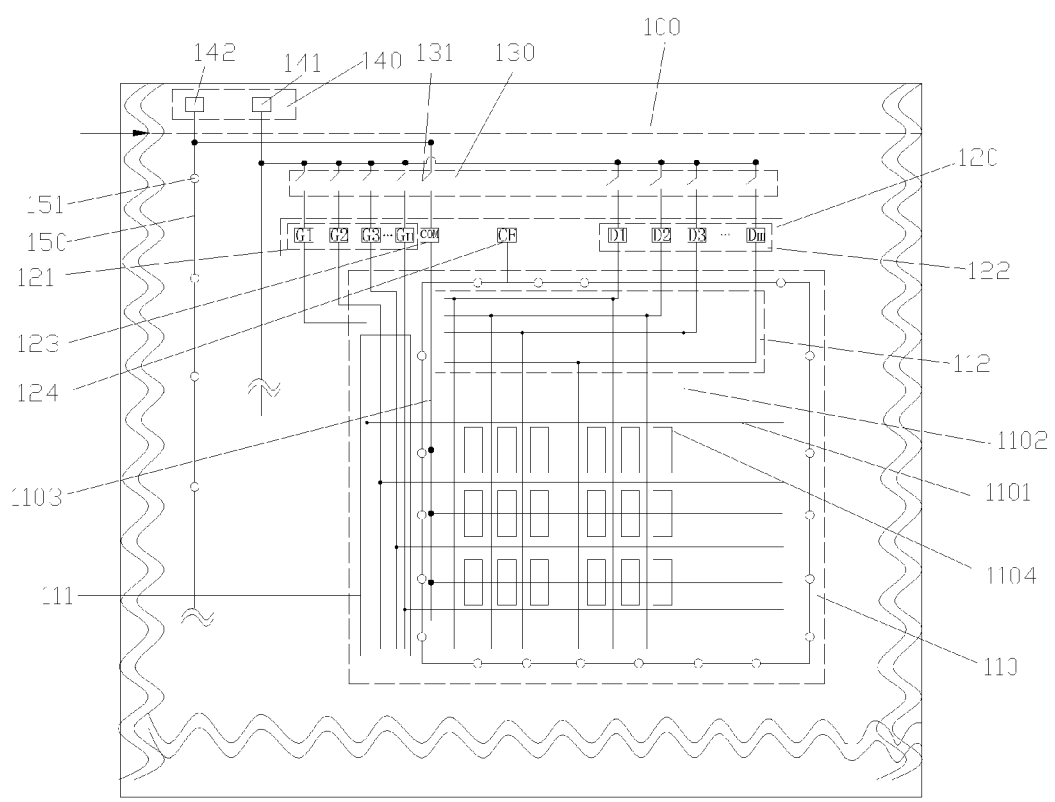
FIG. 3 is a schematic view showing the structure of a substrate for array process of a panel display device according to the present invention.

FIG. 3 is a schematic view showing the structure of a substrate for array process of a panel display device according to the present invention. The substrate for array process of a panel display device according to the present invention is a glass substrate, and the display panel is a liquid crystal display device. As shown in FIG. 3, glass substrate 100 for array process of a panel display device according to the present invention at least includes an area 110 corresponding to a display panel, at least a shorting bar pad set 120, at least a wire 150 serially connected to conductive hole 151, at least a cell switch set 130 and a PSVA mode pad set 140.

In the instant embodiment, an example of glass substrate 100 disposed with an area 110 corresponding to a display panel is used for explanation. Area 110 includes a plurality of scan lines 1101, a plurality of data lines 1102, common electrode line 1103 and a plurality of pixel units 1104, wherein scan lines 1101 and data lines 1102 are disposed in a checkerboard manner, and each pixel unit is electrically connected respectively to at least a corresponding scan line 1101 and at least a corresponding data line 1102.

Area 110 is further disposed with gate shorting bar (not shown) and data shorting bar (not shown), wherein gate shorting bar includes a plurality of scan leads 111, electrically connected respectively to scan lines 1101 on area 110; data shorting bar includes a plurality of data leads 112, electrically connected respectively to data lines 1102.

Peripheral of area 110 is disposed with a shorting bar pad set 120, as shown in FIG. 3. Shorting bar pad set 120 can be divided into scan pad set 121 and data pad set 122, wherein scan pad set 121 includes scan liner pad set 121, data liner pad set 122 and common electrode liner pad 123; wherein scan liner pad set 121 includes scan liner pad G1, G2, . . . , Gn, with each electrically connected respectively to scan lead line 111 of scan shorting bar; data liner pad set 122 includes data line pad D1, D2, . . . , Dm, with each electrically connected respectively to data lead 112 line of data shorting bar; common electrode liner pad 123 is electrically connected to common electrode line 1103.

In addition, shorting bar pad set 120 further includes a color filter liner pad 124, for electrical connection to color filter substrate (not shown) electrode for vertically conducting signal of glass substrate 100 and color filter substrate.

Peripheral of area 110 is further disposed with a wire 150 serially connected to conductive hole 151, wherein conductive hole 151 is for connecting to color filter substrate electrode.

Cell switch set 130 includes a plurality of switch elements 131, and each switch element 131 is electrically connected respectively to a corresponding scan liner pad, data liner pad or common electrode liner pad of shorting bar pad set 120.

PSVA mode pad set 140 includes at least a data scan pad 141 and at least a common electrode pad 142. Each of scan liner pads G1, G2, . . . , Gn of scan liner pad set 121 of shorting bar pad set 120 and each of data liner pads D1, D2, . . . , Dm of data liner pad set 122 of shorting bar pad set 120 are connected through a respective switch element 131 to each of data scan pads 141 of PSVA mode pad set 140. Common electrode liner pad 123 is connected to common electrode pad 142 of PSVA mode pad set 140 through respective switch element 131.

In the instant embodiment, a data scan pad 141 selects, through the at least two switch elements 131, to electrically connect to or disconnect from at least a scan lines 1101 and at least a data line 1102. Common electrode pad 142 is electrically connected to wire 150 serially connected to conductive hole 151, and to common electrode liner pad 123 through another switch element 131 so as to select to electrically connect to or disconnect from common electrode line through another switch element 131.

In other words, data scan pad 141 of PSVA mode pad set 140, through a plurality of corresponding switch elements 131 of cell switch set 130, selects to electrically connect to or disconnect from a same number of scan lines 1101 and data lines 1102 of area 110. Common electrical pad 142 of PSVA mode pad set 140, through at least a corresponding switch element 131 of cell switch set 130, selects to electrically connect to or disconnect from common electrode line 1103.

Therefore, with applying voltage to data scan pad 141 of PSVA mode pad set 140 and conducting switch elements 131 of cell switch set 130 corresponding to scan lines 1101 and data lines 1102, the voltage can be transferred to scan lines 1101 and data lines 1102 of area 110 to perform pretilt angle of liquid crystal molecules in cell process.

Similarly, with applying voltage to common electrode pad 142 of PSVA mode pad set 140 and conducting switch element 131 of cell switch set 130 corresponding to common electrode line 1103, the voltage can be transferred to common electrode line 1103 of area 110 to perform pretilt angle of liquid crystal molecules in cell process.

Figure 4:
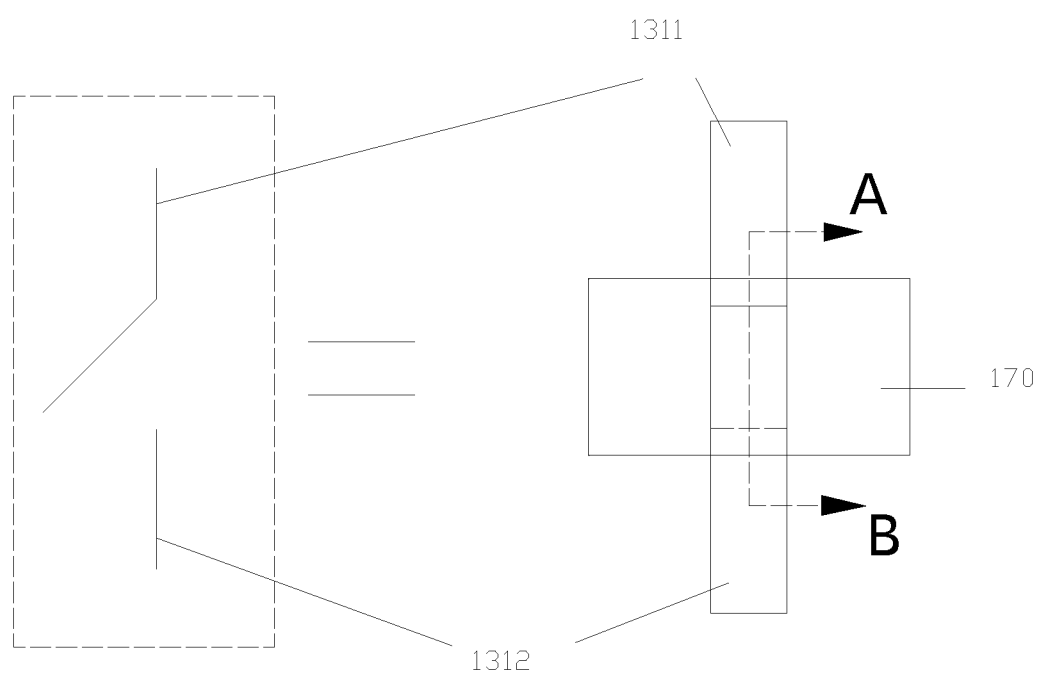
FIG. 4 is a planar schematic view of switch element of FIG. 3, wherein left hand side is an equivalent circuit of the structure on right hand side.
Figure 5:
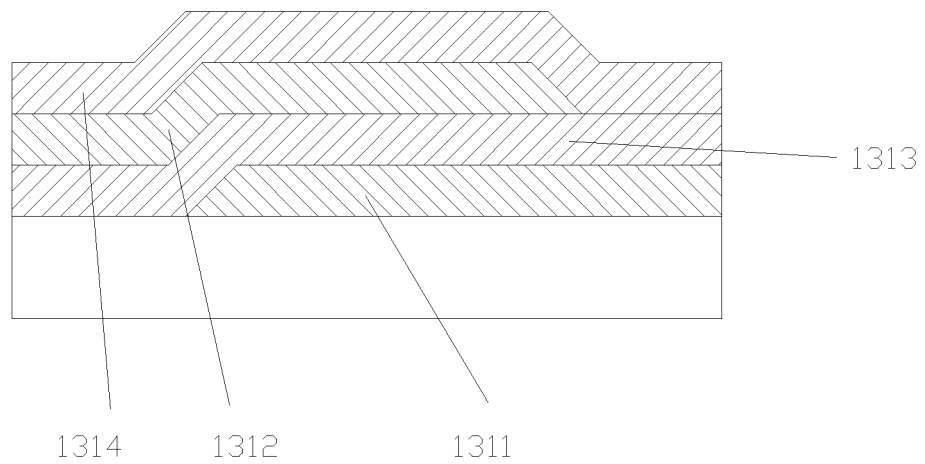
FIG. 5 is a cross-sectional view of switch element of FIG. 4 along AB direction during electrical disconnection.
Figure 6:
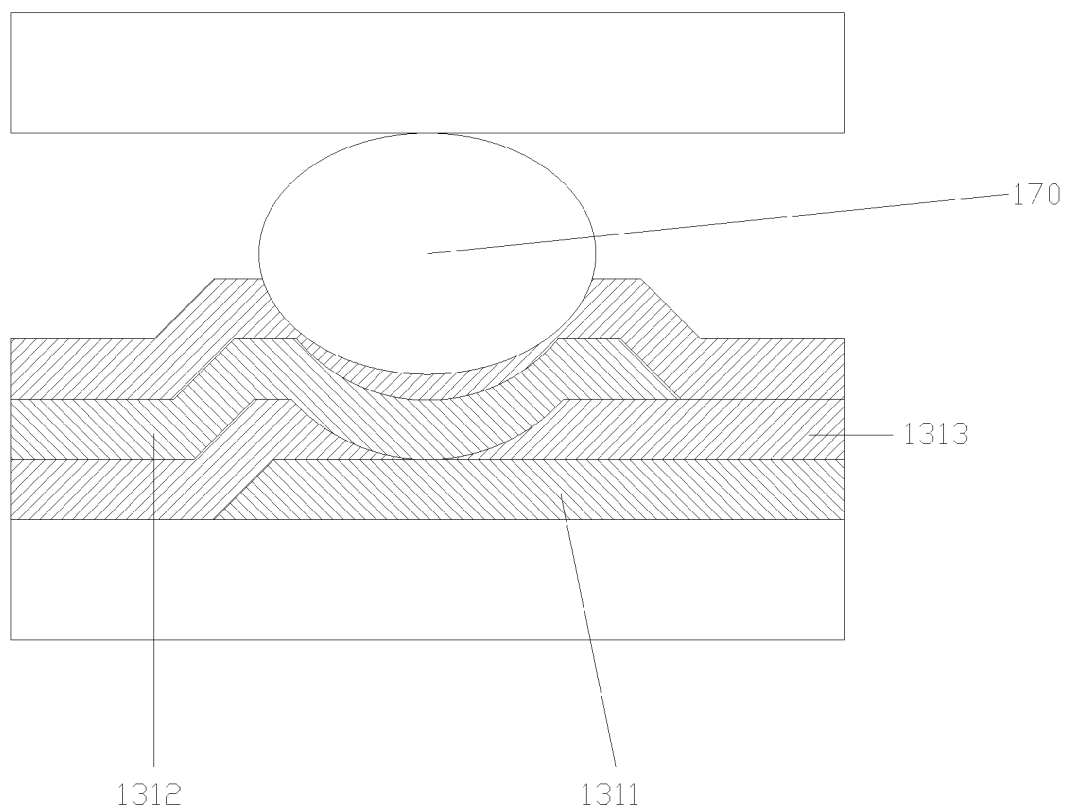
FIG. 6 is a cross-sectional view of switch element of FIG. 4 along AB direction during electrical connection.

FIGS. 4-6 show schematic views of switch element of FIG. 3. As shown in FIGS. 4-5 and referring to FIG. 3, in the instant embodiment, switch element 131 includes a first metal layer 1311, a second metal layer 1312, disposed opposite to first metal layer 1311, and an insulation layer 1313, sandwiched between two metal layers. First metal layer 1311 is electrically connected to data scan pad 141 or wire 150 serially connected to conductive hole 151, and second metal layer 1312 is electrically connected to scan liner pad G1, G2, . . . , Gn, data liner pad D1, D2, . . . , Dm or common electrode liner pad 123. Before cell process, switch element 131 uses insulation layer 1313 to insulate first metal layer 1311 and second metal layer 1312 from each other to make switch element 131 non-conductive and realize selection of electrical disconnection between switch element 131 and corresponding scan line, data line and common electrode line to enable scan liner pad set 121, data liner pad set 122 and common electrode liner pad 123 for array test. Therefore, by using electrically insulated first metal layer 1311 and second metal layer 1312 of switch element 131, the embodiment can make every two pads from common electrode liner pad 123, scan liner pad G1, G2, . . . , Gn and data liner pad D1, D2, . . . , Dm of shorting bar pad set 120 independent. Without electrical connection, array test function of shorting bar pad set 120 is preserved.

In addition, switch element 131 can further include a passive layer 1314, disposed op top of second metal layer 1312.

It should be understood that first metal layer 1311, second metal layer 1312 and insulation layer 1313 of switch element 131 can be formed simultaneously with other electronic components of area 110, such as, scan lines, data lines and in-between insulation layers during manufacturing process.

As shown in FIG. 6, in cell process, a hard seal material 170, such as fiber or spacer, can be applied to an overlapping area of first metal layer 1311 and second metal layer 1312 of switch element 131. Therefore, After array test of cell process, hard seal material 170 is pressed to partially penetrate insulation layer 1313 between first metal layer 1311 and second metal layer 1312 to make two metal layers electrically connected, i.e., switch element 131 conductive and realizing selection of electrical connection between switch element 131 and corresponding scan line, data line or common electrode line for subsequent PSVA test.

Therefore, the present invention is only required to dispose a data scan pad 141 and a common electrode pad 142 in PSVA mode pad set 140 to work with switch elements 131 of cell switch set 130 to apply voltage respectively to a plurality of scan lines 1101, data lines 1102 and common electrode line 1103 of an area 110 to perform test. In other words, the present invention is not required to, as known techniques, to dispose a same number of scan pads for scan lines 1101 of corresponding area in PSVA mode pad set 140, and a same number of data pads for data lines 1102. Hence, number of pads in PSVA mode pad set 140 is greatly reduced. Hence, in a specific embodiment, each scan line 1101 is connected to a switch element 131 correspondingly, each data line 1102 is connected to a switch element 131 correspondingly, and common electrode line is connected to a switch element 131 correspondingly. In addition, one data scan pad 141 is connected respectively to all switch elements 131 corresponding to all scan lines 1101 and all data lines 1102. A common electrode pad 142 is connected to switch element 131 corresponding to common electrode line 1103. At this point, PSVA mode pad set 140 only includes two pads, i.e., data scan pad 141 and common electrode pad 142. The number of pads is greatly reduced and peripheral routes are simplified to improve PSVA process yield rate.

Furthermore, the embodiment of the present invention uses glass substrate 100 disposed with an area 110 corresponding to a display panel for description. It is understood that glass substrate 100 can be disposed with a plurality of areas 110, a plurality of shorting bar pad sets 120, and a plurality of cell switch sets 130, wherein each area 110 corresponding to display panel is connected to a PSVA mode pad set 140 through a corresponding shorting bar pad set 120 and a corresponding cell switch set 130.

In addition, the present invention also provides a method for manufacturing a panel display device, forming structures of FIG. 3 on substrate 100 accordingly, and first keeping two metal layers of switch element 131 of cell switch 1 set 30 insulated to use shorting bar pad set 120 for array testing. Then, after passing test, the method enables switch elements 131 conductive in the cell switch set 130, i.e., to make two metal layers of switch elements 131 of cell switch set 130 electrically connected by pressing, and then uses data scan pad 141 and common electrode pad 142 of PSVA mode pad set 140 to apply voltage for forming pretilt angle of liquid crystal molecules to accomplish alignment.

In addition, it should be understood that after the above test, substrate 100 is cut, i.e., cutting off PSVA mode pad set, and then to produce corresponding liquid crystal display panel. In other words, the manufactured liquid crystal display panel includes an array substrate, a color filter substrate and a liquid crystal layer sandwiched between the array substrate and the color filter substrate. The array substrate includes aforementioned area 110 corresponding to the display panel, shorting bar pad set 120 and cell switch set 130.

Specifically, manufactured liquid crystal display panel includes an array substrate, a color filter substrate and a liquid crystal layer sandwiched between the array substrate and the color filter substrate (all not shown).

As shown in FIGS. 3-6, array substrate includes the following:

An area 110 corresponding to display panel, which further comprising a plurality of scan lines 1101, a plurality of data lines 1102, common electrode line 1103 and a plurality of pixel units (not shown), the plurality of data lines 1101 and the plurality of scan lines 1102 being arranged in a checkerboard manner, each pixel unit electrically connected to a corresponding scan line and a corresponding data line;

A shorting bar pad set 120, disposed outside of area 110 corresponding display panel, further comprising a plurality of scan liner pads G1, G2, . . . , Gn electrically connected to the scan lines 1101 in a one-to-one correspondence manner, and a plurality of data liner pads D1, D2, . . . , Dm electrically connected to data lines 1102 in a one-to-one correspondence manner, and common electrode line 1103 electrically connected to common electrode liner pad 123, and further comprising color filter liner pad for connecting color filter substrate electrode;

A wire 150 serially connected to conductive hole 151, disposed outside of area 110 corresponding to display panel, conductive hole 151 being for connecting to color filter substrate electrode;

A cell switch set 130, disposed outside of area 110 corresponding display panel, comprising a plurality of switch elements 131, one end of each switch element 131 electrically connected to a corresponding scan liner pad, data liner pad or common electrode liner pad;

Wherein the other end of at least two switch elements 131 being electrically connected; after cutting of PSVA mode pad set 140, one end of at least two switch element 131 being electrically connected, and the other end of the at least two switch element 131 through the at least two switch elements 131 to select electrically connected to or disconnected from a same number of scan lines 1101;

Similarly, the other end of at least another two switch elements 131 being electrically connected; after cutting of PSVA mode pad set 140, one end of at least another two other switch elements 131 being electrically connected, and the other end of the at least two other switch elements 131 through the at least two switch elements 131 to select electrically connected to or disconnected from a same number of data lines 1102;

Wherein the other end of at least another switch element 131, through at least a switch element 131, selecting electrically connected to or disconnected from common electrode line.

Obviously, it should be understood that when cutting panel, shorting bar pad set 120 and cell switch set 130 are also cut off so that the manufactured liquid crystal display panel does not include shorting bar pad set 120 and cell switch set 130.

It is noted that, switch element 131 of the present invention can be as aforementioned two overlapping metal layers, insulated at some point of time and pressed to become electrically connected at other point of time. Switch element 131 can also be realized by other switches, such as, a triode.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A substrate for array process of panel display device, which comprises:
    at least an area corresponding to display panel, which further comprising a plurality of scan lines, a plurality of data lines, common electrode lines and a plurality of pixel units, the plurality of data lines and the plurality of scan lines being arranged in a checkerboard manner, each pixel unit electrically connected to a corresponding scan line and a corresponding data line;
    at least a shorting bar pad set, further comprising a plurality of scan liner pads electrically connected to the scan lines in a one-to-one correspondence manner, data liner pads electrically connected to data lines in a one-to-one correspondence manner, common electrode liner pad electrically connected to common electrode line, and color filter liner pad electrically connected to color filter substrate electrode;
    at least a wire serially connected to conductive hole, conductive hole being for connecting to color filter substrate electrode;
    at least a cell switch set, comprising a plurality of switch elements; and
    a PSVA mode pad set, further comprising at least a scan pad, at least a data scan pad and at least a common electrode pad;
    wherein a data scan pad selecting through the at least two switch elements to electrically connect to or disconnect from a same number of scan lines, data lines; common electrode pad being electrically connected to wire serially connected to conductive hole, and electrically connected to common electrode liner pad through at least another switch element;
    each switch element comprising:
    a first metal layer, electrically connected to a data scan pad or a wire serially connected to conductive hole;
    a second metal layer, disposed opposite to the first metal layer and electrically connected to a scan liner pad, a data liner pad or a common electrode liner pad; and
    an insulation layer, disposed between the first metal layer and the second metal layer;
    wherein before cell process, the insulation layer insulating the first metal layer and the second metal layer from each other to realize selection of electrical connection or disconnection between the switch element and a scan line, a data line or a common electrode line;
    during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch element and a scan line, a data line or a common electrode line.

2. The substrate for array process of panel display device as claimed in claim 1, characterized in that number of data scan pad and number of common electrode pad are both 1.

3. A method for manufacturing panel display device, which comprises:
    forming a plurality of scan lines, a plurality of data lines, common electrode line and a plurality of pixel units on an area corresponding to display panel, the plurality of data lines and the plurality of scan lines being arranged in a checkerboard manner, each pixel unit electrically connected to a corresponding scan line and a corresponding data line; forming at least a shorting bar pad set, at least a wire serially connected to conductive hole for connecting to color filter substrate electrode, at least a cell switch set and a PSVA mode pad set, the at least a shorting bar pad set further comprising a plurality of scan liner pads electrically connected to the scan lines in a one-to-one correspondence manner, data liner pads electrically connected to data lines in a one-to-one correspondence manner, and common electrode liner pad electrically connected to common electrode line; the at least cell switch set comprising a plurality of switch elements; the PSVA mode pad set comprising at least a data scan pad and at least a common electrode pad; wherein a data scan pad selecting through the at least two switch elements to electrically connect to or disconnect from a same number of scan lines, data lines; common electrode pad being electrically connected to wire serially connected to conductive hole, and electrically connected to common electrode liner pad through at least another switch element;
    electrically conducting switch elements of cell switch set so as to use data scan pad and common electrode pad in the PSVA mode pad set to perform pretilt angle processing of liquid crystal molecules.

4. The method as claimed in claim 3, characterized in that:
    a step prior to the step of electrically conducting switches in the cell switch comprises: using the shorting bar pad set to perform test on scan lines, data lines and common electrode line correspondingly connected to shorting bar pad set.

5. The method as claimed in claim 3, characterized in that:
    each switch element comprises:
    a first metal layer, electrically connected to a data scan pad or a wire serially connected to conductive hole;
    a second metal layer, disposed opposite to the first metal layer and electrically connected to a scan liner pad, a data liner pad or a common electrode liner pad; and
    an insulation layer, disposed between the first metal layer and the second metal layer;
    wherein before cell process, the insulation layer insulating the first metal layer and the second metal layer from each other to realize selection of electrical connection or disconnection between the switch element and a scan line, a data line or a common electrode line;
    during cell process, applying hard seal material to overlapping area of the first metal layer and the second metal layer so that the insulation layer being broken during pressing seal material to result in electrical connection between the first metal layer and the second metal layer to realize selection of electrical connection or disconnection between the switch element and a scan line, a data line or a common electrode line.

6. The method as claimed in claim 3, characterized in that number of data scan pad and number of common electrode pad are both 1.

7. The method as claimed in claim 3, characterized in that the shorting bar pad set further comprises a color filter liner pad, for connecting color filter substrate electrode.

8. A liquid crystal display panel, which comprises:
    an array substrate, a color filter substrate and a liquid crystal layer sandwiched between the array substrate and the color filter substrate;
    the array substrate further comprising: an area corresponding to display panel, which further comprising a plurality of scan lines, a plurality of data lines, common electrode lines and a plurality of pixel units, the plurality of data lines and the plurality of scan lines being arranged in a checkerboard manner, each pixel unit electrically connected to a corresponding scan line and a corresponding data line;

a shorting bar pad set, further comprising a plurality of scan liner pads electrically connected to the scan lines in a one-to-one correspondence manner, data liner pads electrically connected to data lines in a one-to-one correspondence manner, and common electrode liner pad electrically connected to common electrode line;

a wire serially connected to conductive hole, disposed outside of area corresponding to display panel, conductive hole being for connecting to color filter substrate electrode;

a cell switch set, disposed outside of area corresponding to display panel, comprising a plurality of switch elements, each end of each switch element being electrically connected to a corresponding scan liner pad, data liner pad or common electrode liner pad;

wherein the other end of at least two switch elements being electrically connected, the other end of at least two switch elements, through the at least two switch elements, selecting electrically connected to or disconnected from a same number of scan lines;

the other end of at least another two switch elements being electrically connected, the other end of the at least another two switch elements, through at least two switch elements, selecting electrically connected to or disconnected from a same number of data lines;

the other end of at least another switch element, through the at least another switch element, selecting electrically connected to or disconnected from common electrode line.

9. The liquid crystal display panel as claimed in claim 8, characterized in that the shorting bar pad set further comprises a color filter liner pad, for connecting color filter substrate electrode.

* * * * *